United States Patent
Alissa et al.

(10) Patent No.: US 12,546,429 B2
(45) Date of Patent: Feb. 10, 2026

(54) JETTING-BASED PIPELINE SCRAPER

(71) Applicant: SAUDI ARABIAN OIL COMPANY, Dhahran (SA)

(72) Inventors: Faisal Mohammed Alissa, Dammam (SA); Yazeed Alamro, Riyadh (SA); Mohammad A. Aleissa, Safwa (SA); Omar Firas Ashi, Jeddah (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 62 days.

(21) Appl. No.: 18/478,397

(22) Filed: Sep. 29, 2023

(65) Prior Publication Data

US 2025/0109817 A1  Apr. 3, 2025

(51) Int. Cl.

| F16L 55/36 | (2006.01) |
|---|---|
| B08B 9/049 | (2006.01) |
| B08B 9/055 | (2006.01) |
| F16L 55/40 | (2006.01) |
| F16L 55/46 | (2006.01) |
| F16L 101/12 | (2006.01) |

(52) U.S. Cl.
CPC ............ *F16L 55/36* (2013.01); *B08B 9/0497* (2013.01); *B08B 9/0552* (2013.01); *F16L 55/40* (2013.01); *F16L 55/46* (2013.01); *F16L 2101/12* (2013.01)

(58) Field of Classification Search
CPC ...... B08B 9/055; B08B 9/0552; B08B 9/0557; B08B 9/0558; B08B 9/0497; F16L 55/36; F16L 55/38; F16L 55/40; F16L 2101/12
See application file for complete search history.

(56) References Cited

U.S. PATENT DOCUMENTS

| 5,127,125 A | 7/1992 | Skibowski |
| 6,527,869 B1 * | 3/2003 | Bourg ................. B08B 9/0553 |
| | | 15/104.062 |
| 9,744,572 B2 | 8/2017 | Englent |
| 11,148,151 B2 * | 10/2021 | Schneider .......... B05B 13/0627 |

FOREIGN PATENT DOCUMENTS

| CN | 104907192 A | 9/2015 |
| CN | 206632077 U | 11/2017 |
| CN | 213915289 U | 8/2021 |
| CN | 218191519 U | 1/2023 |

(Continued)

OTHER PUBLICATIONS

International Search Report issued for corresponding international patent application No. PCT/US2024/048092, mailed Feb. 7, 2025 (8 pages).

(Continued)

*Primary Examiner* — Laura C Guidotti
(74) *Attorney, Agent, or Firm* — Osha Bergman Watanabe & Burton LLP

(57) ABSTRACT

Systems include a device and a pipeline. The device includes a body. The body includes jetting elements and a sealing disc. The jetting elements include a hose, an opening, channels, and nozzles. The jetting elements are configured to direct pressurized fluid through the body for purposes of cleaning and propelling the device along the pipeline. The sealing discs are configured to maintain a seal between the body of the device and the inside wall of the pipeline.

10 Claims, 7 Drawing Sheets

(56) References Cited

FOREIGN PATENT DOCUMENTS

| | | | | |
|---|---|---|---|---|
| DE | 102011013472 A1 | | 9/2012 | |
| DE | 102015107098 A1 | * | 11/2016 | ........... B08B 9/0495 |
| EP | 0856364 A2 | | 8/1998 | |
| EP | 2 697 481 B1 | | 9/2019 | |
| FR | 2610224 A1 | | 8/1988 | |
| FR | 2 698 713 A1 | | 6/1994 | |
| GB | 2581801 A | | 9/2020 | |
| JP | 02-222762 A | * | 9/1990 | ........... B08B 9/0497 |
| WO | 2016/098307 A1 | | 6/2016 | |

OTHER PUBLICATIONS

Written Opinion issued for corresponding international patent application No. PCT/US2024/048092, mailed Feb. 7, 2025 (14 pages).

Wang, Wenda et al., "Experimental Study on Mechanisms of Wax Removal During Pipeline Pigging"; Proceedings of the SPE Annual Technical Conference and Exhibition; Paper No. SPE-174827-MS; pp. 1-25; Sep. 28, 2015 (25 pages).

Sousa, A. M. et al., "Planning pipeline pigging operations with predictive maintenance"; E3S Web of Conferences; vol. 266, Topical Issues of Rational Use of Natural Resources 2021, Article No. 01017; pp. 1-19; Jun. 4, 2021 (19 pages).

Hendrix, M H W et al., "Development of speed controlled pigging for low pressure pipelines"; Proceedings of the 18th International Conference on Multiphase Production Technology; Paper No. BHR-2017-501; pp. 501-509; Jun. 7, 2017 (9 pages).

Li, Yumei et al., "Investigation of the factors affecting the self-propelled force in a multi-orifice nozzle using a novel simulation method"; Energy Science & Engineering; vol. 8, Issue 9; pp. 3136-3147; Sep. 2020 (12 pages).

* cited by examiner

JETTING-BASED PIPELINE SCRAPER

BACKGROUND

In typical oil or gas fields, there are many wells producing hydrocarbons. These wells are connected through flowlines (4"-8" pipes) to a trunk line (10"-36" pipes) and these trunk lines transport the fluids to the gas-oil-separation plants (GOSPs). Typically, oil is produced from a plurality of geological formations containing hydrocarbons, known as oil or gas reservoirs, and, through the flowlines, the fluids of these reservoirs are transported to the trunk lines where they mix and homogenize during the flow until they reach the GOSP.

Alongside the oil, there is an amount of water enriched with ions. At certain conditions such as a pressure decrease, temperature increase, or homogenization of various fluids, some debris or solid crystals precipitate from the water layer and stick inside the trunk-line walls forming what is sometimes called "scales." These scales affect production stability and can cause catastrophic environmental events. Therefore, the scale must be removed. In small flowlines, chemical dissolution is feasible due to small volume and reasonably short length which can enable circulation of dissolver until pipe's full potential is restored and all scales are removed.

However, in trunk lines, the solution is different. A large tool, known as a scraper, is pushed from the beginning of the trunk line, i.e., from the launcher door, and, with produced fluids, the scraper is pushed all the way to the end of the trunk line to the receiver door. The operation of utilizing a scraper to clean a pipeline is known in the industry as "pipeline pigging." Conventional pipeline pigging can result in the scraper getting stuck in the pipeline due to scales and/or insufficient pressure to push the scraper all the way through a pipeline.

Accordingly, there exists a need for a pipeline scraper that does not rely on pipeline pressure and can be retrieved in the event of becoming stuck. Similar concerns of pipe scrapers becoming stuck can occur in other pipelines, such as water wells and chemical processing plants among others.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, the embodiments herein relate to a device. The device includes a body. The body includes jetting elements and a sealing disc. The jetting elements include an opening, channels, and nozzles. The jetting elements are configured to direct pressurized fluid through the body and direct the fluid for purposes of cleaning and propelling the device along a pipeline. The sealing discs are configured to maintain a seal between the body of the device and the inside wall of the pipeline.

In general, in one aspect, the embodiments herein relate to a system. The system includes a device and a pipeline. The device includes a body. The body includes jetting elements and a sealing disc. The jetting elements include a hose, an opening, channels, and nozzles. The jetting elements are configured to direct pressurized fluid through the body for purposes of cleaning and propelling the device along the pipeline. The sealing discs are configured to maintain a seal between the body of the device and the inside wall of the pipeline.

In general, in one aspect, the embodiments herein relate to a method. The method includes disposing a pipeline cleaning device within the pipeline. The pipeline cleaning device includes a body. The body includes jetting elements and a sealing disc. The method further includes injecting a fluid through the jetting elements of the pipeline cleaning device. The injected fluid is directed in a direction along the pipeline provides a reaction force to the pipeline cleaning device that moves the pipeline cleaning device a prescribed distance along the pipeline.

Other aspects and advantages of the claimed subject matter will be apparent from the following description and the appended claims.

DETAILED DESCRIPTION

In one aspect, embodiments disclosed herein relate to a device and method for dislodging debris from the inside of a pipeline as well as a technique for retrieving the pipeline cleaning device from the pipeline.

Figure 1:
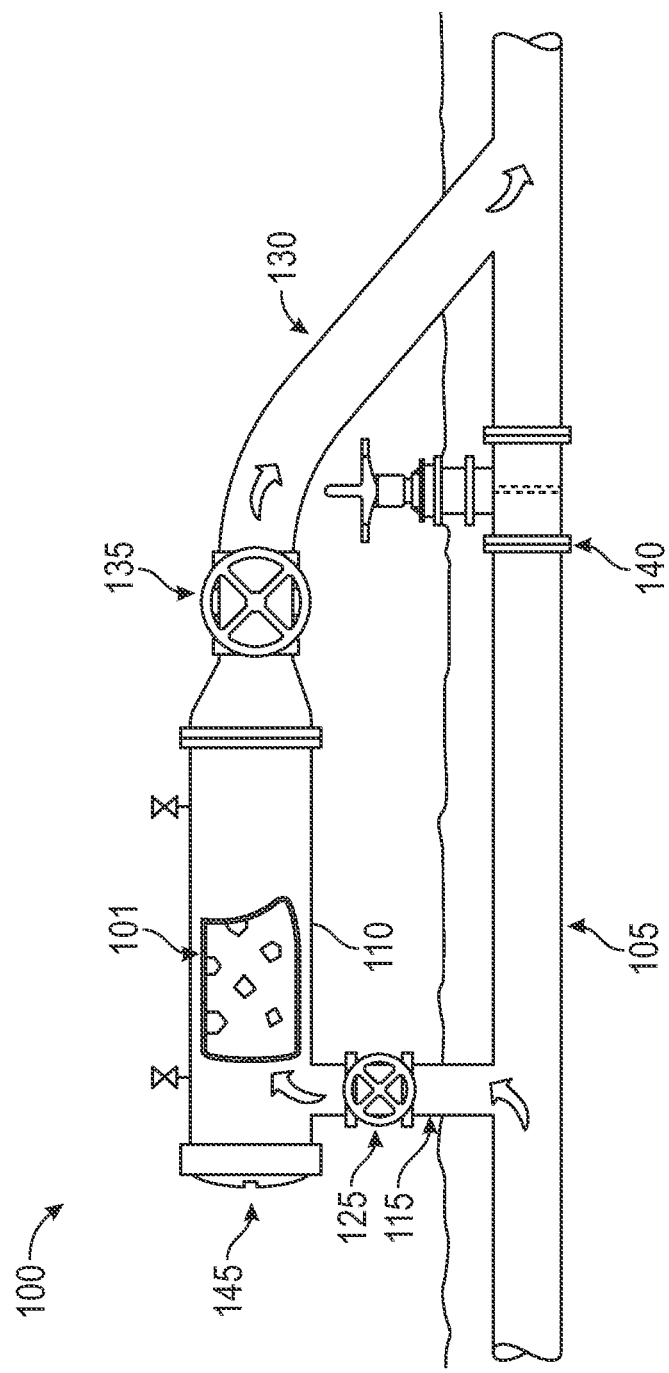
FIG. 1 shows a pipeline pig launcher in accordance with one or more embodiments.

FIG. 1 shows a pipeline pig launcher 100 in accordance with one or more embodiments. The arrangement shown is one embodiment of a pipeline pig launcher 100 consistent with known practices. A pig 101, in this context, refers to a self-contained device sent along a pipeline by pressure to clean the pipeline 105. The purpose of a pipeline pig launcher is to facilitate loading a pig 101 into a pipeline 105 without ever having a direct opening from the inside of the pipeline 105 open to the outside. This is accomplished by having a launch barrel 110 arranged parallel to the pipeline 105 with two lengths of pipe connecting the launch barrel 110 to the pipeline 105. The kicker line 115 connects from the pipeline to the launch barrel 110 behind where the pig 101 is placed. The kicker line 115 is divided by the kicker valve 125. The pup line 130 connects from the pipeline 105 downstream of the kicker line to the launch barrel 110 in front of where the pig 101 is placed. The pup line 130 is divided by the isolation valve 135. Between where the kicker line 115 and the pup line 130 connect to the pipeline 105, the pipeline 105 is divided by the pipeline bypass valve 140. The launch barrel 110 features a door 145 to isolate the launch barrel 110 from the outside.

To use the pipeline pig launcher 100 in standard pigging operations, the kicker valve 125 and isolation valve 135 are closed and the door 145 is opened. A pig 101 is then loaded into the launch barrel 110 and the door 145 is closed. Finally, to send the pig 101 along the pipeline 105, the pipeline valve is closed and the kicker valve 125 and isolation valve 135 are opened.

A similar configuration may be used in standard pipeline pigging operations to retrieve the pig 101 from the pipeline system.

The pipeline cleaning device disclosed herein has the key benefit of not requiring the same complex pipeline 105 infrastructure to enable cleaning of the pipeline 105.

Figure 2:
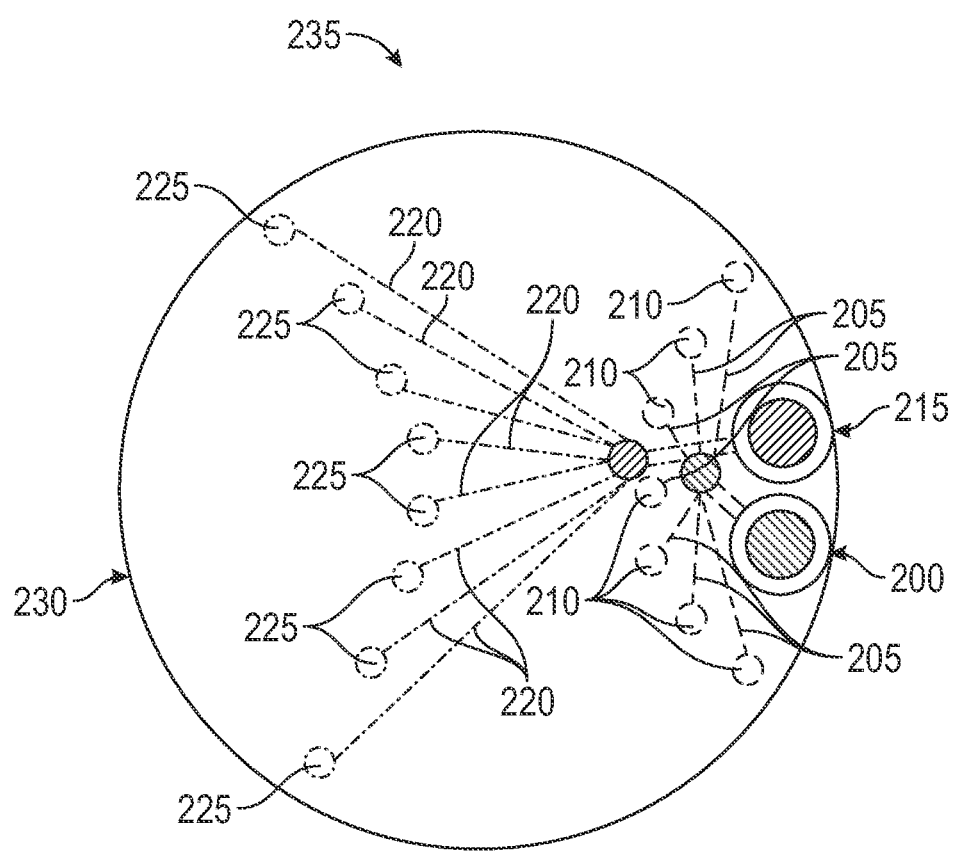
FIG. 2 shows the first and second fluid flow paths in the pipeline cleaning device in accordance with one or more embodiments.

FIG. 2 shows the first and second fluid flow paths in accordance with one or more embodiments. The first fluid flow path comprises a first opening 200, a plurality of first channels 205, and a plurality of first nozzles 210 connected in series as shown. The second fluid flow path likewise comprises a second opening 215, a plurality of second channels 220, and a plurality of second nozzles 225 also connected in series. The first and second fluid flow paths may be arranged within the body 230 of the pipeline cleaning device 235 (hereafter referred to as "the device 235") such that the fluid flow paths can direct fluid from the openings through the nozzles and along opposing directions of the pipeline 105. In this embodiment, the first opening 200 and second opening 215 may be arranged to be substantially adjacent and encircled by the plurality of first nozzles 210. The body 230 may be spherical to allow smooth movement in the pipeline 105.

Figure 3B:
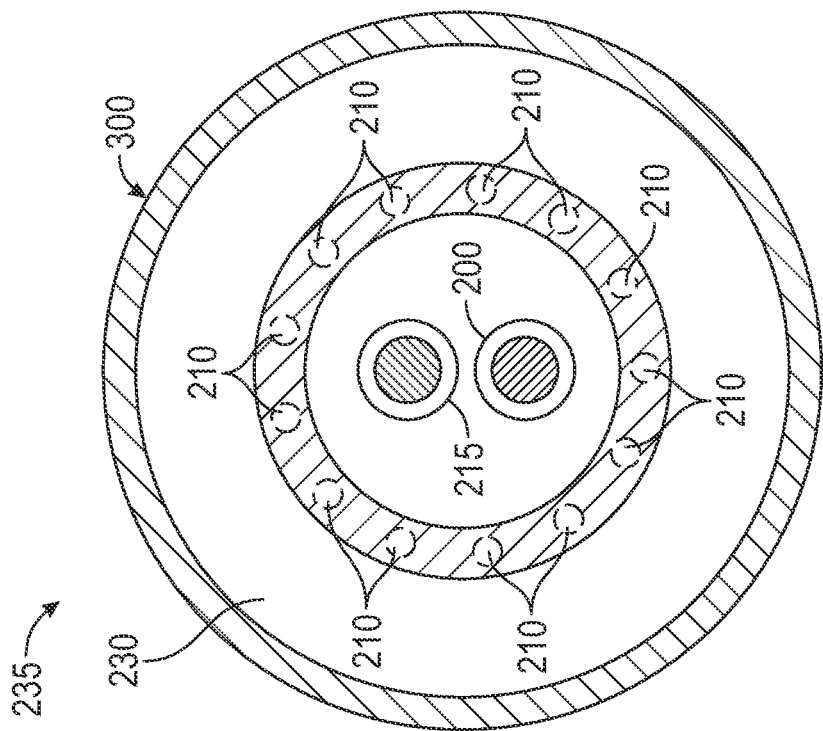
FIG. 3B shows a view of the pipeline cleaning device from the first direction in accordance with one or more embodiments.
Figure 3A:
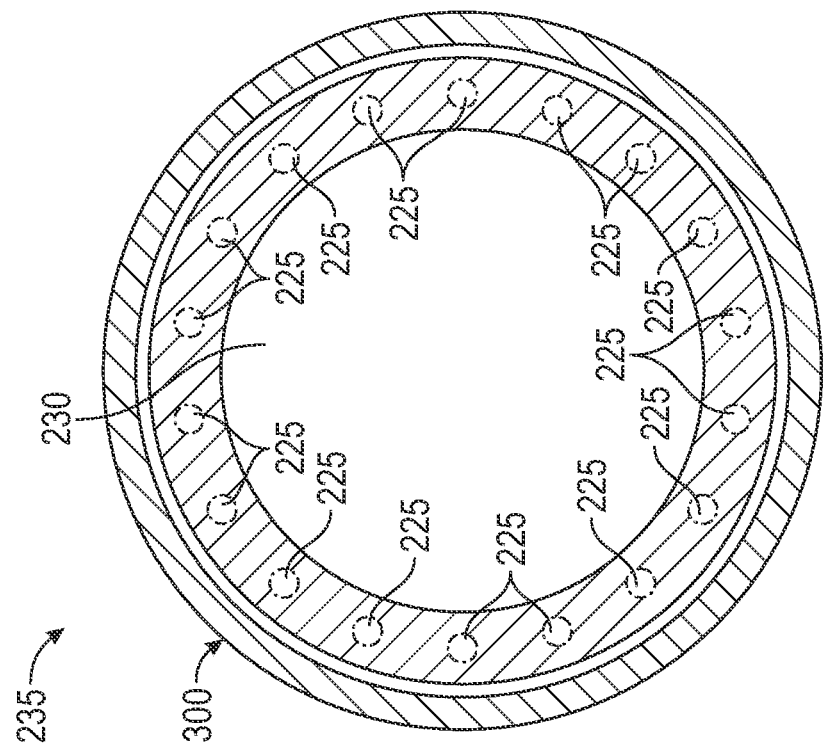
FIG. 3A shows a view of the pipeline cleaning device from the second direction in accordance with one or more embodiments.

FIG. 3A shows a view of the device 235 from the second direction in accordance with one or more embodiments. The second direction in this case refers to the pipeline direction along which the plurality of second nozzles 225 faces. A sealing disc 300 may be fitted around the outer surface of the body 230 to abut against an inner circumference of the pipeline and prevent fluid flow around the device 235 in the pipeline. The sealing disc 300 further serves to dislodge debris from the walls of the pipeline.

FIG. 3B shows a view of the device 235 from the first direction in accordance with one or more embodiments. The first direction in this case refers to the pipeline direction along which the plurality of first nozzles 210 faces. The first opening 200 may be arranged substantially adjacent to the second opening 215 and encircled by the plurality of first nozzles 210.

Figure 4:
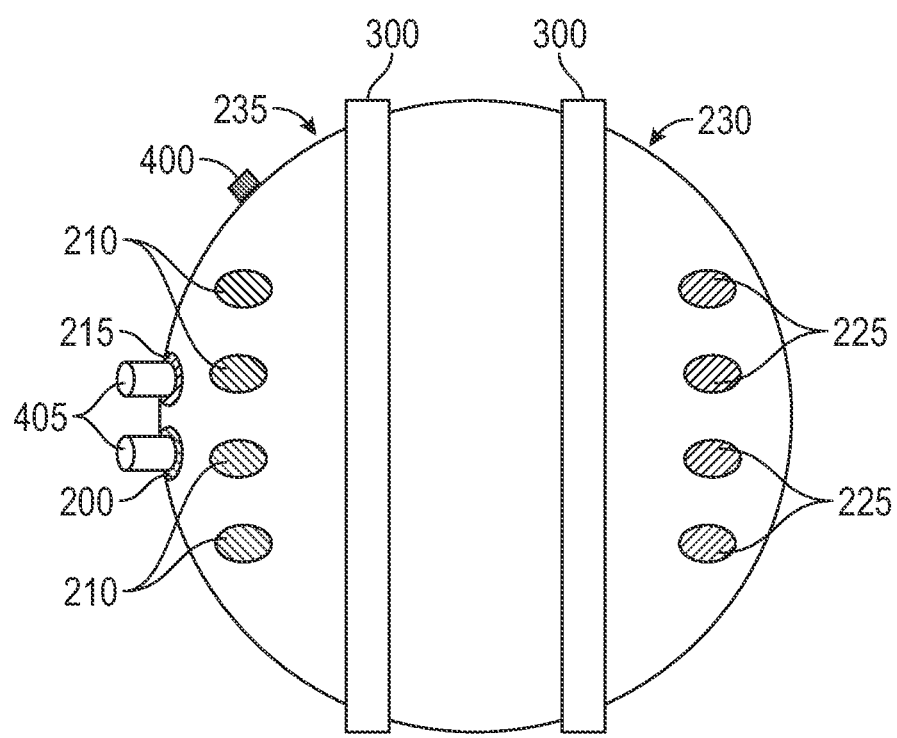
FIG. 4 shows a side view of the pipeline cleaning device in accordance with one or more embodiments.

FIG. 4 shows a side view of the device 235 in accordance with one or more embodiments. The plurality of first nozzles 210 may be arranged on the surface of the body 230 on one side of the sealing discs 300 along with a sensor 400, a first opening 200, a second opening 215, and hose connectors 405. The hose connectors 405 allow hoses to be temporarily attached and detached as opposed to having the hoses permanently attached to the body 230. The hose connectors 405 could have one of many configurations to fit standards for pressurized connections. For example, the hose connectors 405 could be threaded or quick-disconnect fittings. The plurality of second nozzles 225 may be arranged on the surface of another side of the body. The sensor 400 may serve to monitor the pipeline 105 conditions by measuring at least one of temperature, and pressure. For example, the sensor 400 could be a camera checking for damage in the pipeline 105 or a chemical sensor monitoring for intrusions into the pipeline 105.

Figure 5:
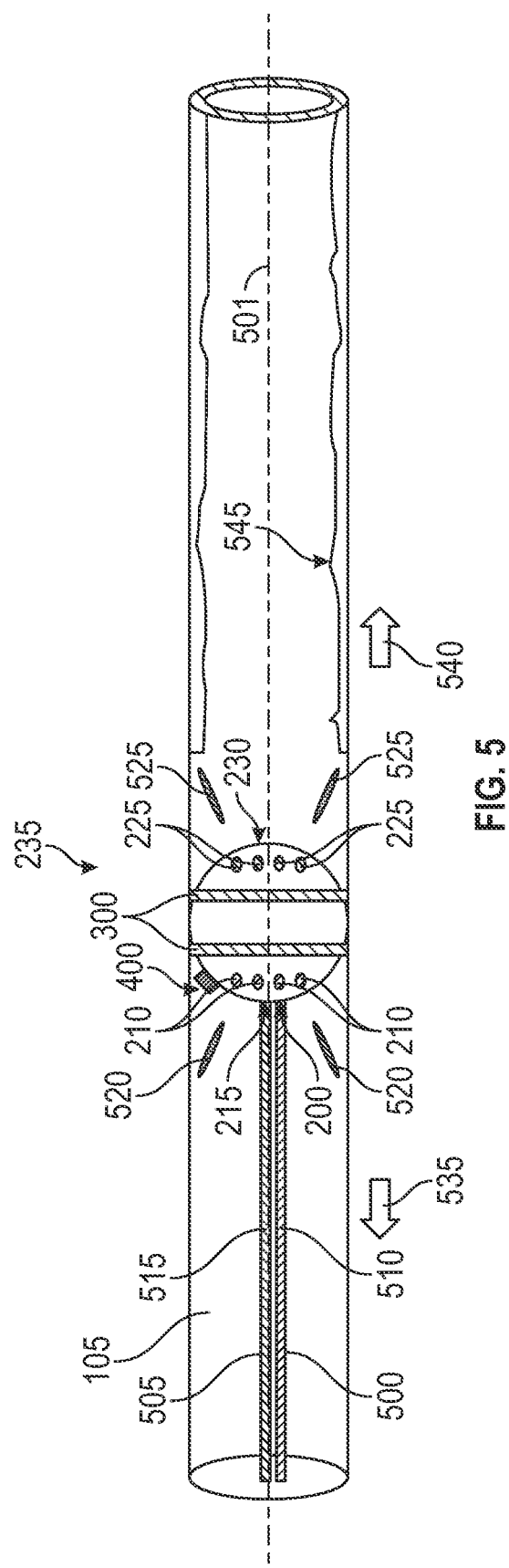
FIG. 5 shows the pipeline cleaning device inside a pipeline in accordance with one or more embodiments.

FIG. 5 shows the device 235 inside a pipeline 105 in accordance with one or more embodiments. The device 235 may be arranged as shown in FIG. 4, additionally with a first hose 500 and a second hose 505 connected to the first opening 200 and second opening 215 respectively via the hose connectors 405 (not shown). Note that the radial elements in this embodiment (the sealing discs 300, the plurality of first nozzles 210, and the plurality of second nozzles 225) may be arranged coaxially surrounding the longitudinal axis 501 of the pipeline 105. The radial symmetry and coaxial nature of the radial elements facilitates omnidirectional cleaning of the pipeline 105 interior. The first hose 500 and second hose 505 may carry in them a first fluid 510 and a second fluid 515 respectively to flow under pressure through the first and second fluid flow paths. When injected through the fluid flow paths, the first fluid 510 and second fluid 515 become the injected first fluid 520 and the injected second fluid 525 respectively. According to the embodiment, the first fluid 510 and second fluid 515 may each comprise at least one of water, an abrasive chemical, and a cleaning chemical. For example, water could be used to provide propulsion as it is cheap and plentiful, and abrasive chemicals could be used to dislodge debris.

When the device 235 is being used to clean a pipeline 105, the injected first fluid 520 may be directed along the first direction 535 of the pipeline 105 to generate a reaction force on the device 235 and move the device 235 along the longitudinal axis 501 of the pipeline 105 in the second direction 540. The movement of the device 235 along the pipeline 105 may cause the sealing discs 300 to scrape against the inner circumference of the pipeline 105 and thereby dislodge any debris 545 and accumulate that debris 545 ahead of the device 235 to be pushed out of the pipeline 105.

Figure 6:
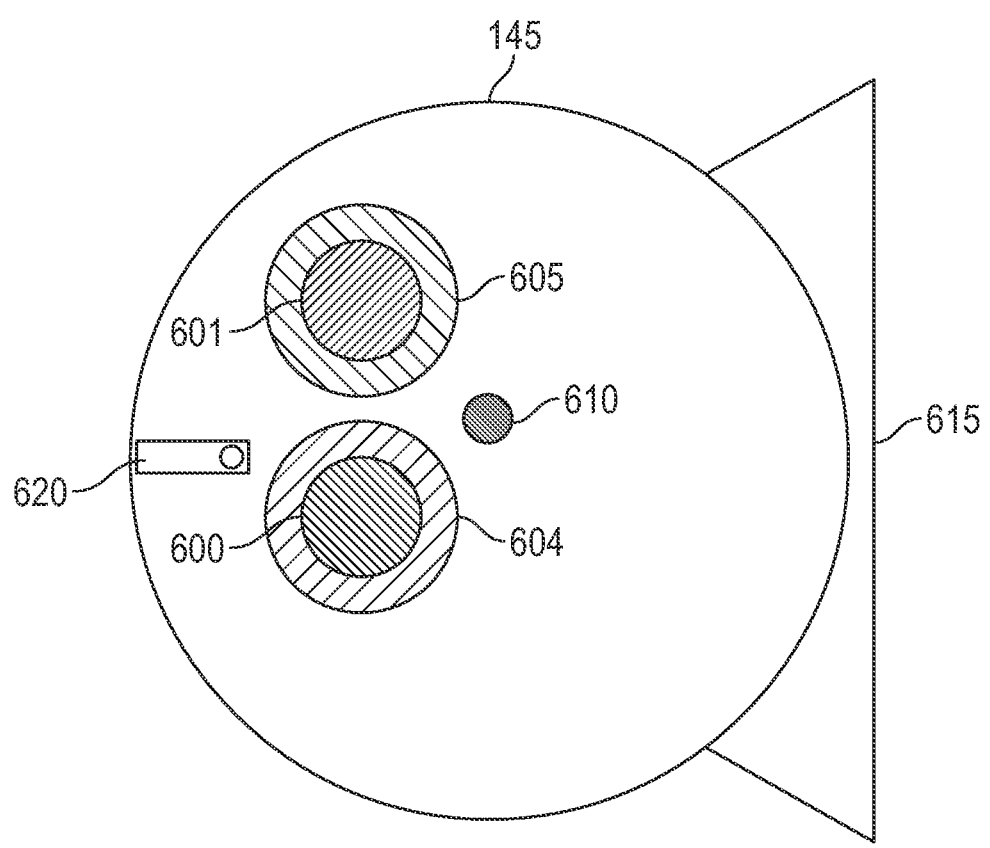
FIG. 6 shows the door of the system for cleaning a pipeline in accordance with one or more embodiments.

FIG. 6 shows the door of the system for cleaning a pipeline in accordance with one or more embodiments. To allow the hoses to reach the device 235 when the door 145 is closed, the door 145 may have a first hose opening 600 and a second hose opening 601. To keep the pipeline 105 sealed around the hoses, the first hose opening 600 and the second hose opening 601 may have a first seal 604 and a second seal 605 respectively. This allows the injected first fluid 520 to pressurize the pipeline which supplies additional force for moving the device 235 along the pipeline 105. To relieve potentially dangerous excess pressure, the door 145 may have an auto-bleeding valve 610 configured to relieve pressure within the pipeline at a prescribed pressure. The auto-bleeding valve may also be able to fully release the pressure in the pipeline 105 on demand. To allow the device 235 to be disposed into and out of the pipeline 105, the door may have a hinge 615. In order to hold the door closed when the device 235 is in use, the door may have a latch 620.

Figure 7:
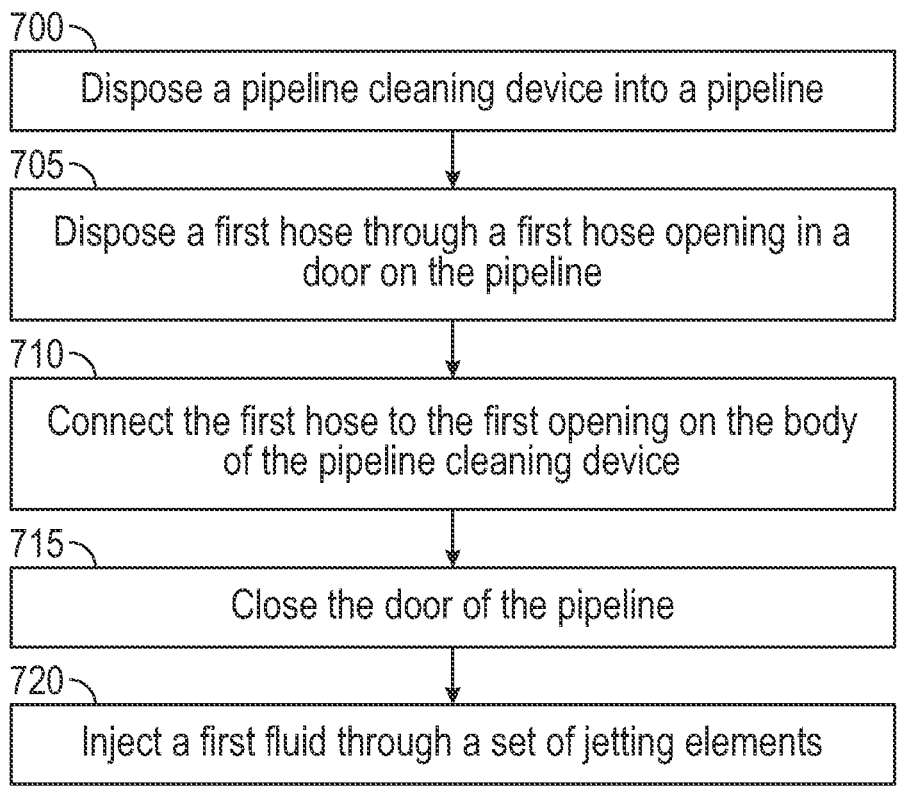
FIG. 7 is a flowchart in accordance with one or more embodiments.

FIG. 7 is a flowchart in accordance with one or more embodiments. The flowchart of FIG. 7 describes at least one embodiment of the method for using the device 235 for cleaning a pipeline 105. Step 700 is to dispose the device 235 into the pipeline 105. The device should be oriented with the hose connectors 405 facing towards the door 145. Step 705 is to dispose the first hose 500 through the first hose opening 600. In embodiments where the device 235 and door 145 are equipped to accept a second hose 505, a second hose 505 may be disposed through the second hose opening 601. Step 710 is to connect the first hose 500 to the first opening 200 on the device 235. In embodiments where the device 235 is equipped to accept a second hose 505, the second hose 505 may be connected to the second opening 215 in the device 235. The hoses are connected to the device 235 by means of hose connectors 405 which provide a pressure tight seal between the hoses and the fluid flow paths. Step 715 is to close and latch the door of the pipeline. This provides a pressure tight seal to keep fluids and pressure inside the pipeline 105. Step 720 is to inject the first fluid 510 through a first set of jetting elements. This sends the first fluid in the first direction 535 to provide a reaction force to move the device 235 in the second direction. The jetting elements may be the openings, channels, and nozzles in the device 235. The process of injecting the first fluid 510 may be continued and/or repeated until the device has been moved along the pipeline 105 a prescribed distance. If the reaction force is insufficient to move the device 235 along the pipeline 105, the pipeline 105 on one side of the device 235 can be pressurized to provide additional force. In embodiments where the device 235 is equipped with a second set of jetting elements, a second fluid 515 may be injected through the second set of jetting elements. The second fluid 515 may be directed against the walls of the pipeline 105 in the second direction 540 to aid in dislodging debris 545.

Figure 8:
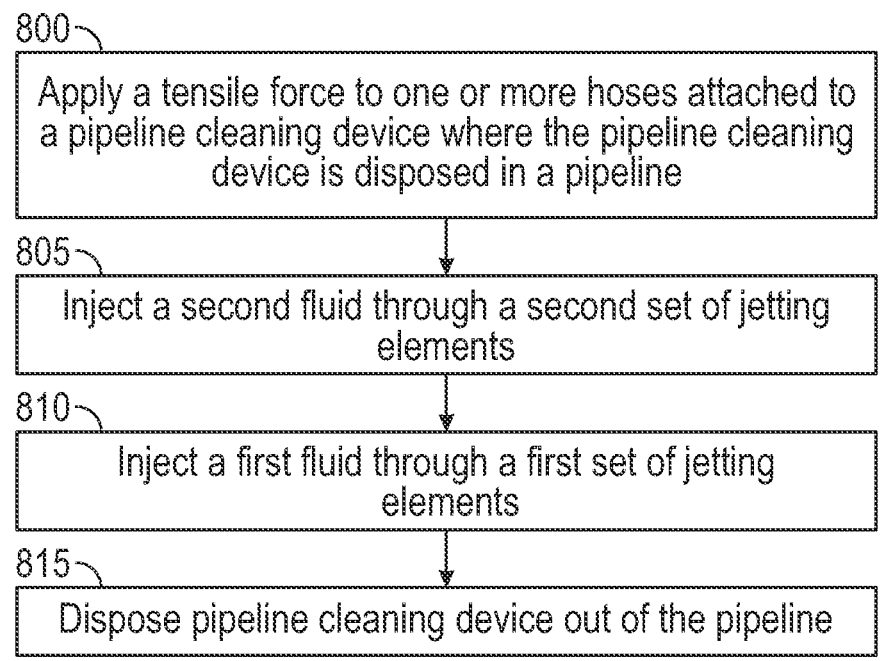
FIG. 8 is a flowchart in accordance with one or more embodiments.

FIG. 8 is a flowchart in accordance with one or more embodiments. The flowchart of FIG. 8 describes at least one embodiment of the technique for retrieving the device 235 in a situation where the device 235 has become stuck in the pipeline 105. Step 800 is to apply a tensile force to one or more hoses attached to the device 235. If the applied tensile force provided is not sufficient to move the device 235 to where it can be retrieved, step 805 calls for injecting the second fluid 515 through the second set of jetting elements which are part of the second fluid flow path and along the second direction 540 of the pipeline 105. The injected second fluid 525 serves to provide a reaction force to the device 235 in the first direction 535 sufficient to overcome resistance to the movement of the device 235. Step 810 calls for injecting the first fluid 510 through the first set of jetting elements which are part of the first fluid flow path. The injected first fluid 520 serves to dislodge any debris that may be obstructing the retrieval of the device 235. Step 815 is simply to dispose the device 235 out of the pipeline 105 after the device 235 has been moved to where the device 235 can be retrieved.

The embodiments presented herein have the following advantages over the current state of the art. Many jet cleaning devices for pipelines rely on fluid alone to dislodge and remove debris and standard pigs 101 rely on scraping the walls of the pipeline while being propelled by fluid flow in the pipeline. Embodiments of the present invention combine the advantages of both. The device 235 allows cleaning of pipelines not able to push fluid at high pressure while minimizing risk of the device 235 becoming stuck, similar to jet cleaning devices, while also having the ability to thoroughly physically scrape the walls of the pipeline like a pig 101 so that debris is not left behind.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 212 (f) for any limitations of any of the claims herein, except for those in which the claim expressly uses the words 'means for' together with an associated function.

What is claimed is:

1. A pipeline cleaning device comprising:
   a body comprising:
      jetting elements comprising:
         a first opening,
            wherein the first opening comprises a hose connector,
         a first plurality of channels,
         a first plurality of nozzles,
            wherein the first opening is connected to each of the first plurality of nozzles by each of the first plurality of channels to comprise a first fluid flow path,
            wherein the first fluid flow path is configured to direct a first fluid along a first direction to move the pipeline cleaning device along a pipeline,
         a second opening,
         a second plurality of channels, and
         a second plurality of nozzles,
            wherein the second opening is connected to each of the second plurality of nozzles by each of the second plurality of channels to comprise a second fluid flow path,
            wherein the second fluid flow path is configured to direct a second fluid along a second direction to aid in dislodging the debris; and
      one or more sealing discs,
         wherein each of the one or more sealing discs fits around an outer surface of the body to abut against an inner circumference of the pipeline and prevent fluid flow around the pipeline cleaning device in the pipeline, and
         wherein the movement of the one or more sealing discs along the pipeline dislodges debris from the pipeline,
         wherein the movement of the pipeline cleaning device along the pipeline causes the one or more sealing discs to scrape against the inner circumference of the pipeline, thereby dislodging and accumulating debris ahead of the pipeline cleaning device to be pushed out of the pipeline.

2. The pipeline cleaning device of claim 1, wherein the body is spherical.

3. The pipeline cleaning device of claim 1, wherein the second fluid comprises at least one of water, an abrasive chemical, and a cleaning chemical.

4. The pipeline cleaning device of claim 1, further comprising one or more sensors,
   wherein each of the one or more sensors is attached to the body,
   wherein the one or more sensors are configured to measure at least one of temperature and pressure.

5. The pipeline cleaning device of claim 1, wherein the first plurality of nozzles is arranged on the body such that the first plurality of nozzles surrounds a longitudinal axis of the pipeline.

6. A system for cleaning a pipeline comprising:
   a pipeline cleaning device comprising:
      a body comprising:
         jetting elements comprising:
            a first opening, a first plurality of channels,
a first plurality of nozzles, and
a first hose,
  wherein the first hose, the first opening, the first plurality of channels, and the first plurality of nozzles are each connected in series to comprise a first fluid flow path,
  wherein a first fluid, being directed along a first direction of the pipeline causes the pipeline cleaning device to move along the pipeline,
a second opening,
a second plurality of channels,
a second plurality of nozzles, and
a second hose,
  wherein the second hose, the second opening, the second plurality of channels, and the second plurality of nozzles are each connected in series to comprise a second fluid flow path to direct a second fluid along a second direction to aid in dislodging debris from the pipeline; and
one or more sealing discs,
  wherein each of the one or more sealing discs is fitted around the body of the pipeline cleaning device to abut against an inner circumference of the pipeline when the pipeline cleaning device is disposed within the pipeline, and
  wherein the movement of the one or more sealing discs along the pipeline dislodges debris from the pipeline, and the pipeline,
  wherein the pipeline cleaning device is configured to clean the inside of the pipeline when disposed within the pipeline and fluid is injected through the first fluid flow path.

7. The system of claim 6,
wherein the first hose is temporarily attachable to the first opening by way of a hose connector.

8. The system of claim 6,
wherein the second fluid comprises at least one of water, an abrasive chemical, and a cleaning chemical.

9. The system of claim 6,
wherein the pipeline comprises a door,
wherein the pipeline cleaning device is disposed within the pipeline via the door,
wherein the door comprises a first hose opening,
wherein the first hose is disposed through the first hose opening, and
wherein the first hose opening comprises a seal,
wherein the seal surrounds the first hose opening so as to provide a pressure tight seal of the pipeline when the first hose is disposed in the first hose opening and the door is closed.

10. The system of claim 9,
wherein the door further comprises an auto-bleeding valve configured to relieve pressure within the pipeline at a prescribed pressure.

* * * * *